United States Patent [19]

Ligensa

[11] Patent Number: 4,932,816
[45] Date of Patent: Jun. 12, 1990

[54] CONNECTING DEVICE FOR AIRCRAFT SEATS AND THE LIKE

[75] Inventor: Karl H. Ligensa, Obersontheim, Fed. Rep. of Germany

[73] Assignee: Keiper Recaro GmbH & Co., Fed. Rep. of Germany

[21] Appl. No.: 309,193

[22] Filed: Feb. 13, 1989

[30] Foreign Application Priority Data

Feb. 12, 1988 [DE] Fed. Rep. of Germany ....... 3804354

[51] Int. Cl.$^5$ ............................................. B64D 11/06
[52] U.S. Cl. ................................. 410/105; 244/118.6; 248/503.1; 410/104
[58] Field of Search ............... 410/104, 105, 103, 115, 410/116, 150; 248/424, 429, 503.1, 499; 244/118.6, 122 R

[56] References Cited

U.S. PATENT DOCUMENTS

| | | |
|---|---|---|
| 3,677,195 | 7/1971 | Prete, Jr. ............................ 410/105 |
| 4,062,298 | 12/1977 | Weik .................................... 410/105 |
| 4,256,424 | 3/1981 | Knox et al. ......................... 410/105 |
| 4,376,522 | 3/1983 | Banks .................................. 410/105 |
| 4,509,888 | 4/1985 | Sheek .................................. 410/105 |
| 4,708,549 | 11/1987 | Jensen ................................. 410/105 |

FOREIGN PATENT DOCUMENTS

| | | |
|---|---|---|
| 10053923 | 6/1982 | European Pat. Off. . |
| 20200511 | 12/1986 | European Pat. Off. . |
| 3447178 | 7/1986 | Fed. Rep. of Germany . |

Primary Examiner—Andres Kashnikow
Assistant Examiner—Matthew C. Graham
Attorney, Agent, or Firm—Wigman & Cohen

[57] ABSTRACT

A device for connecting the feet of an aircraft seat to a perforated rail with a C-shaped cross-section includes a base unit on which two feet are centrally arranged at a spacing distance from each other that is equal to the space between the holes. A bridge that overlaps the base unit from above has two legs that encompass the base unit between them and are supported on the rail. An anchor fitting which as an outside shape adapted to the shape of the holes at least over a portion of its periphery is height-adjustable relative to the feet by way of the two legs of the bridge. One of the two feet is arranged between the anchor fitting and the other foot. The portion of the bridge penetrated by the screw is arranged relative to the support portions of the two legs such that a loading of the bridge toward the base unit through the screw passing through the yoke portion of the bridge results in a moment of torque in the sense of a pivot movement of the end sections of the legs connected with the anchor fitting toward the rail.

18 Claims, 3 Drawing Sheets

CONNECTING DEVICE FOR AIRCRAFT SEATS AND THE LIKE

BACKGROUND OF THE INVENTION

The invention relates generally to a device for connecting a system element, such as a foot of an aircraft seat, and a perforated rail having a C-shaped cross-section.

In a known device of the aforementioned type, as in many other corresponding devices, the anchor fitting functions to secure the connecting device against shifting in the longitudinal direction of the perforated rail arranged between the two feet of the base unit. The connecting device is prevented from lifting away from the perforated rail by the two feet which engage respective tongues that are present between successive holes formed by the end portions of the perforated rail cross-sections that confront each other. With the aid of screws and a bridge supported on the rail, the feet can be tightened against the underside of the tongues, thus attaining a tight connection between the device and the perforated rails. If a tensile force is applied to this known device in both the longitudinal direction of the perforated rails and also in a direction which acts to lift the base unit from the perforated rails, then the device is loaded in the sense of a tipping about a lateral axis lying between the two feet, which results in the force component acting in the sense of a lifting away from the perforated rails which must be assumed only by one of the two feet and the two tongues of the perforated rail beneath which it engages.

An additional disadvantage of the known device is that the two legs of the bridge, to which the respective halves of the anchor fitting are matched, must engage in respective recesses of the base unit. This results in a portion of the force acting on the anchor fitting tending to cause the screws to bend, which is undesirable, because these screws must be easily accessible in order to make the connection of the device with the perforated rail and, also release it, as quickly as possible.

OBJECTS AND SUMMARY OF THE INVENTION

A primary object of the invention is to provide a device of the above-described type that yields more favorable force transfer relationships. This and other objects will become more apparent from the description which follows.

Briefly, the arrangement of one foot between the anchor fitting and the other foot has the result that under a tensile load acting at an angle to the longitudinal axis of the perforated rail both feet are subjected to a load, as are two pairs of tongues in the perforated rail, and they are loaded approximately equally. In addition, a single crew person can readily secure the anchor fitting into one of the holes in the perforated rail or remove it from this hole, tighten the feet of the base unit against the tongues of the perforated rail or release the tension. Such tension is effected by pressing the bridge against the rail by means of a screw, which provides a torque in the sense of a pivot movement of the end section of the legs connected with the anchor fitting toward the perforated rail exerted on the bridge when its legs rest on the perforated rail.

In one preferred embodiment the anchor fitting is directly and form-fittingly connected with the base unit, whereby it is assured that the bridge and the screw are not loaded by the forces to be transferred from the anchor fitting. The anchor fitting and its connection with the base unit is easily carried out. The anchor fitting can be flattened which allows it to engage directly into the perforated rail next to the tongue pair beneath which the adjacent foot of the base unit engages.

The forces to be transferred from the bridge to the anchor fitting only need to effect the introduction of the anchor fitting into a hole in the perforated rail and the removal from such a hole, by the connection according to this invention between these two structural elements.

In a preferred embodiment the legs of the bridge are provided with an opening above their support surface, into which opening the two end sections of the cross bar that passes through the base unit or two aligned pins with an amount of play. From the position of the bar or pin ends in the opening it can be seen, if the screw is tightened, whether the anchor fitting is in proper engagement with one of the holes of the perforated rail or is sitting on a tongue pair.

The present invention contributes toward the simplification of installation, because of the provision of shaped tongues and other elements which make possible the recognition of the correct position of the device relative to the holes in the rail.

BRIEF DESCRIPTION OF THE DRAWINGS

The invention is described in greater detail below with the aid of an exemplary embodiment illustrated in the drawings.

DETAILED DESCRIPTION OF A PREFERRED EMBODIMENT

Figure 4:
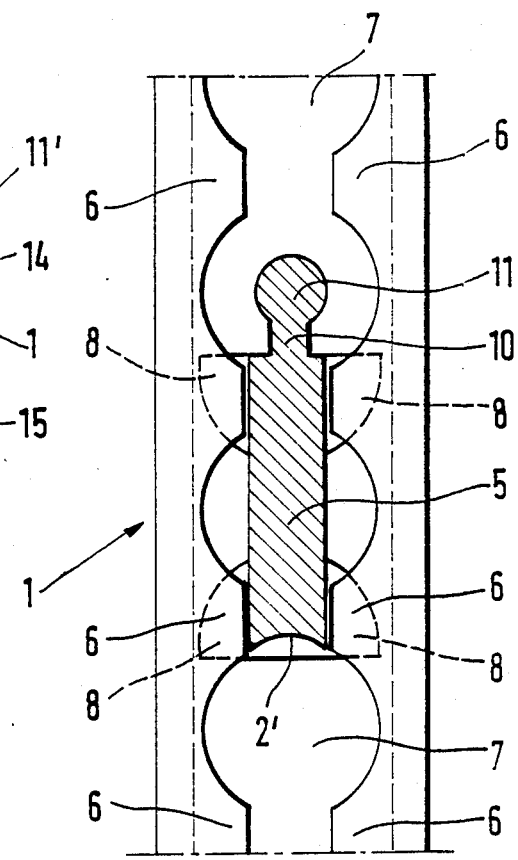
FIG. 4 is a section taken along the line IV—IV of FIG. 3.
Figure 2:
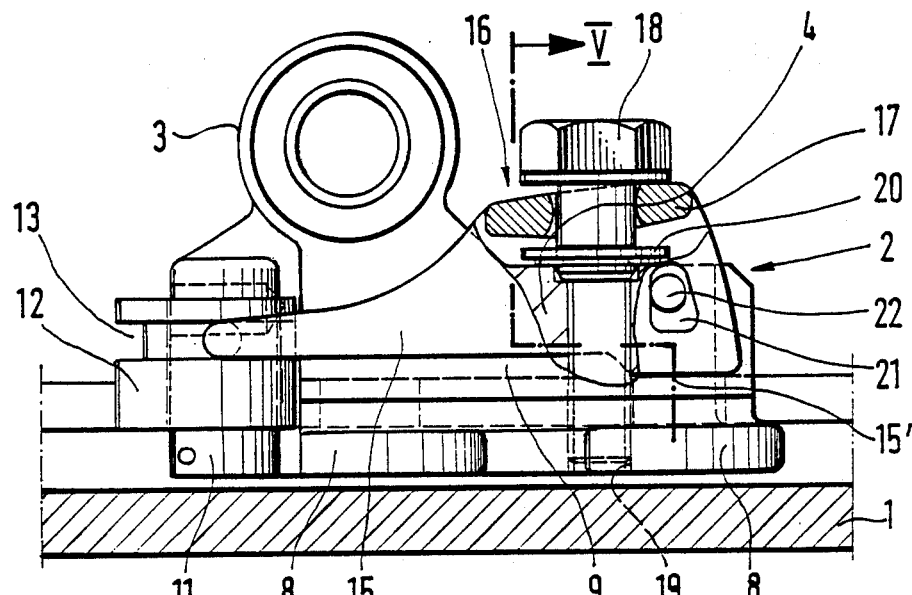
FIG. 2 is an elevational view in section of the exemplary embodiment in the condition of a secure connection with the rail.
Figure 3:
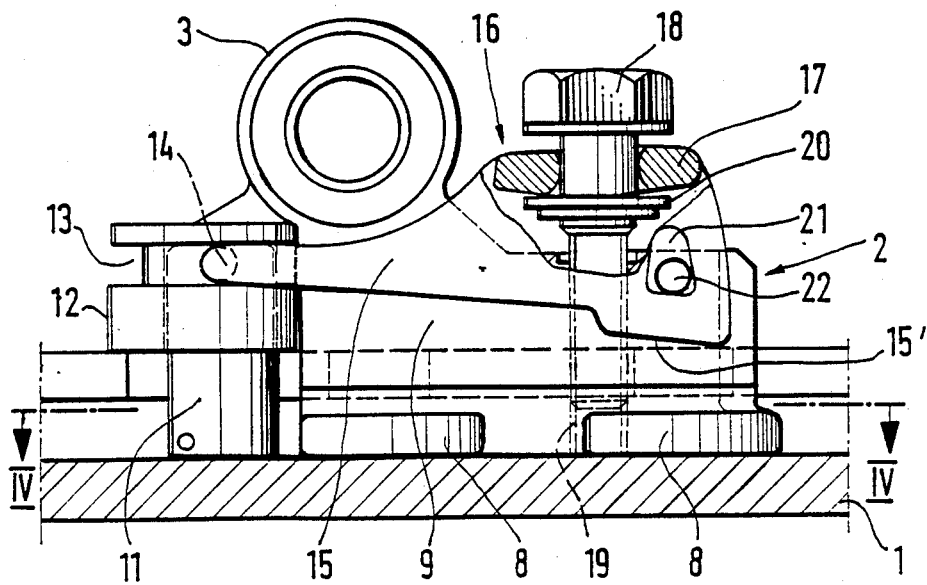
FIG. 3 is an elevational view in section of an exemplary embodiment in the inserted condition, but not yet connected with the rail.

Referring to the drawings wherein like numbers indicate like parts throughout the several views, a device for securing a form-fitting connection between a foot of an aircraft seat (not shown) and a conventional rail 1 that is secured to the floor, includes a one-piece base unit generally designated as 2. As best shown in FIGS. 2 and 3, the base unit 2, on its side opposite the rail 1, forms a lateral hub 3 with a bore designed to receive a bolt that connects the base unit 2 with the foot of the aircraft seat. The hub 3, the bore of which includes two outwardly conically expanding end sections adjoining a cylindrical center section, is formed on a block-like center portion 4 in order to prevent jamming of the bolt. On the side opposite the hub 3, the base unit includes a center portion 4 having a web 5, generally rectangular in cross-section, whose width when measured laterally to the longitudinal direction of the rail 1 is somewhat smaller than the width of the slot bordered by the confronting tongues 6 of the rail 1. As shown in FIG. 4, the length of the web 5 is selected so that it extends from the beginning of a first pair of tongues 6 to the end of the immediately following pair of tongues 6. The center of the web 5 is aligned with the center of one of the holes 7 in the rail 1.

Figure 5:
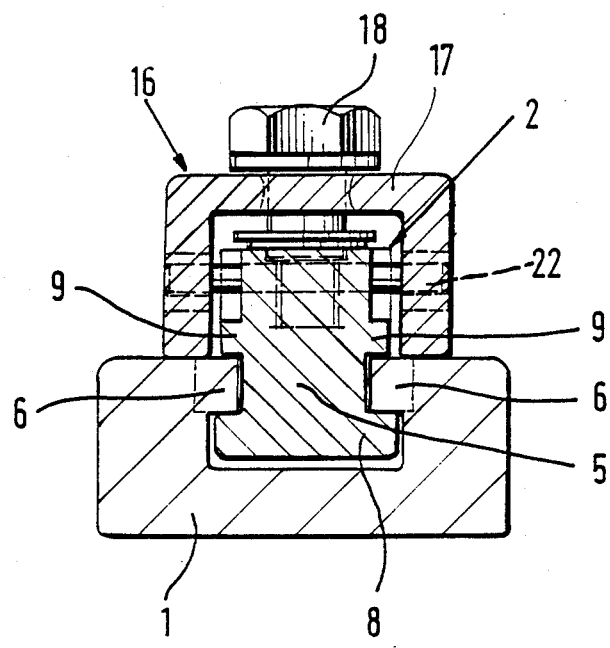
FIG. 5 is a section taken along the line V—V of FIG. 2.

As seen in FIGS. 4 and 5, the web 5 terminates with two plate-like feet 8, which project laterally beyond the web 5 and are therefore capable of slideably engaging the tongues 6. Feet 8 are longitudinally spaced from each other by a distance equal to the distance between two adjacent holes 7 formed by a pair of adjacent and confronting tongues 6. The portions of the feet 8 that project laterally beyond the web 5 have a semi-circular contour, the radius of which is slightly smaller than the radius of the holes 7, such that, the feet 8 can be introduced through the holes 7, and thereafter removed. The feet 8 can also have the shape of individual complete circles, if desired. In the exemplary embodiment, however, they have the shape of a semi-circle, whereby the straight portion of the contour runs in the lateral direction of the rail 1 and is at least approximately aligned with one or the other narrow end surface of the base unit 2.

As shown in FIG. 5, the base element 2 further includes opposite projecting sections 9, adjacent the upper side of the feet 8 having a thickness somewhat larger than the thickness of the tongues 6. Sections 9 project laterally beyond the web 5 and form, together with the web 5 and the feet 8, a lateral groove in which the tongues 6 slideably engage when the base unit 2 is placed in the rail 1.

As seen in FIG. 4, spacer 10 is formed on one narrow side of the center portion 4, and a pin member 11 is formed, in turn, on the spacer 10. The longitudinal axis of this pin 11, the lower frontal surface of which lies in the plane defined by the underside of the feet 8, stands vertically on this plane. The space between the pin 11 and the base unit 2 is chosen so that the pin 11 is aligned with the center of one of the holes 7 when the feet 8 are located beneath two successive tongue pairs in the longitudinal direction of the rail. As shown in FIG. 4, the diameter of the pin 11 is also larger than the width of the spacer 10, but significantly smaller than the diameter of the holes 7.

Figure 1:
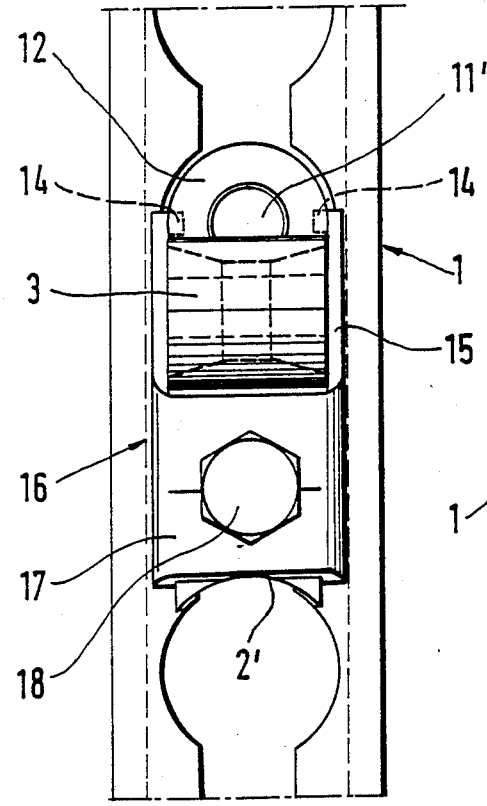
FIG. 1 is a plan view showing an exemplary embodiment, according to the present invention.

A moveable anchor fitting (or plunger) 12 is arranged on the pin 11 in such a manner as to be capable of sliding vertically, as shown in FIGS. 2 and 3. The anchor fitting 12 is C-shaped in cross-section, the opening of which receives pin 11, as seen in FIG. 1. Fitting 12 has a smooth cover surface on the side facing the base unit 2, which surface abuts the frontal surface of the base unit 2. Because the anchor fitting 12 engages in both grooves formed by the base unit 2, the spacer 10 and the pin 11, it is form-fittingly connected with the base unit 2 in directions lateral to the longitudinal direction of the pin 11. The lower portion of the anchor fitting 12 is cylindrically shaped to be removeably positioned in one of the holes 7. Fitting 12 is formed with a radius that is slightly smaller than the radius of the hole 7, such that, the anchor fitting 12 can be inserted in one of the holes 7 and removed therefrom. In its inserted condition it form-fittingly secures the base element 2 against shifting in the longitudinal direction of the rail 1.

The portion of the fitting 12 projecting beyond the upper side of the rail 1 in its inserted condition is provided with an annular groove 13. Two oppositely positioned fingers 14 formed from respective legs 15 of bridge member 16, are moveably positioned in the annular groove 13. Preferably, legs 15, bridge 16, base unit 2 and the anchor fitting 12, are made of steel. The bridge 16 over the two legs 15 and a yoke portion 17 which connects them forms a U-shaped profile that is open toward the base unit 2, and surrounds from above the portion of the base unit 2 lying adjacent the hub 3. An opening is provided in the yoke portion 17 for receiving screw 18 therethrough and into a threaded bore 19 provided in the base unit 2 arranged parallel to the anchor fitting 12. By means of this screw 18, the bridge 16 cannot only be moved toward the rail 1, but also, due to a ring 20 securely arranged on the shaft of the screw, which ring 20 can rest against the underside of the yoke portion 17, can also be moved away from the rail 2.

From the lateral plane defined by the screw 18 out to the anchor fitting 12, the two legs 15 of the bridge 16 each form one long lever arm and, in the opposite direction, one short lever arm. Each short lever arm forms a support surface 15' that projects beyond the underside of the long lever arm toward the rail 1 and, as shown in FIG. 2, rests full length on the upper side of the rail 1 when the screw 18 is tightened and the anchor fitting 12 is located in one of the holes 7. The support of the bridge 16 by means of the support surface 15' on the upper side of the rail 1 has the result that when the screw 18 is tightened, the feet 8 are tightened against the underside of the tongues 6.

Above the support surface 15' both legs 15 are provided with respective openings 21, each of which, both in the longitudinal direction of the screw 18 and laterally thereto, is larger in dimension than the lateral pin 22 of the base unit 2 that engages therein. The pivotable connection of the bridge 16 with the base unit 2 by means of the lateral pin 22 has the result that, as shown in FIG. 3, as the screw 18 is rotated out of the threaded bore 19, the legs 15 perform a pivoting movement in the sense of lifting the anchor fitting 12 out of the rail 1. In addition, the lateral bar limits the degree to which the screw 18 can be turned out. Furthermore, the position of the lateral bar 22 in the opening 21 allows one to see whether, as the screw 18 is tightened, the anchor fitting 12 penetrates into one of the holes 7 or has come to rest on the upper side of the rail 1. In the latter case the lateral bar 22 is located in the lower portion of the opening 21, as shown in FIG. 3, and not in the upper portion, as shown in FIG. 2. As long as the screw 18 has not been tightened, the seating of the yoke portion of the bridge 16 allows a pendulum movement, for which purpose the play of the lateral bar 22 in the opening 21 and the engagement of the pins 14 in the annular groove 13 also contribute thereto. As a result of the pendular moveability of the bridge 16, the bridge 16 can always be adjusted as the screw 18 is set so that the support surfaces 15' come into full-surface contact with the rail 1.

As shown by FIGS. 1 and 4, the narrow end surface 2' of the base unit 2 opposite the anchor fitting 12 is cylindrically curved, whereby the curve radius is equal to the radius of the holes 7 and the end surface 2' is aligned with one of the holes 7 when the anchor fitting 12 is also aligned with one of the holes 7. Therefore, a second, identical device can adjoin the end surface immediately adjacent the anchor fitting. Especially, however, it is easy to see whether the device is in the correct position for the connection with the rail 1.

In order to produce a connection between the foot of the aircraft seat and the rail 1, the two feet 8 of the base unit 2 need only be introduced through two of the holes 7 in the rail 1 into the interior of the rail and then the base unit is pushed by half the hole spacing in the longitudinal direction of the rail in order to produce a play-free connection by tightening the screw 18, whereby the feet 8 transfer upwardly directed forces into the rail 1 and the anchor fitting 12 transfers longitudinally acting forces into the rail 1. To release the connection one need only turn the screw 18 out of the threaded bore 19 until the anchor fitting 12 is lifted out of the rail 1. After sliding the base unit in the longitudinal direction of the rail by half the distance of the hole spacing, the feet 8 can then be lifted out of the rail 1.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A connecting device for connecting a system element, particularly the feet of an aircraft seat, and a perforated rail having a C-shaped cross-section, which rail is provided with holes that are arranged in a row in the longitudinal direction of the rail and are uniformly spaced on its side formed by the cross-sectional ends that are directed toward each other, the connecting device comprising:
   (a) a base unit with a foot portion that can be placed in the longitudinal channel in the rail through the holes therein, on which the foot portion and two feet are centrally arranged and are spaced from each other by the same distance as the hole spacing, the width of the feet being larger than the width of the slot in the rail;
   (b) a bridge that overlaps the base unit from above laterally to the longitudinal direction of the rail, which bridge has two legs that between them encompass the base unit and can be supported on the rail, and having a yoke portion connecting the legs, which yoke portion is passed through by a screw that engages in a threaded bore in the base unit;
   (c) an anchoring fitting, which, at least over a portion of its periphery, has an outside contour adapted to the shape of the holes, and is height-adjustable relative to the feet by means of two legs of the bridge;
   (d) one of the two feet is arranged between the anchor fitting and the other foot; and
   (e) the portion of the bridge penetrated by the screw is arranged relative to the support portion of the two legs in the rail in such a manner that a loading on the bridge by the screw toward the rail effects a moment of torque in the sense of a pivoting movement of the end sections of the legs connected with the anchor fitting toward the rail.

2. The connecting device according to claim 1, wherein the anchoring fitting is arranged on a pin of the base unit so as to be capable of sliding longitudinally, and the end sections of the legs are pivotally connected with the anchor fitting.

3. The connecting device according to claim 2, wherein the anchor fitting has a longitudinal bore that receives the pin, and a radial slot opens into this bore, said slot having a width that is smaller than the diameter of the longitudinal bore, and in which a web connects the pin with the base unit.

4. The connecting device according to claim 3, wherein the anchor fitting is flattened on its side facing the base unit.

5. The connecting device according to claim 3, wherein the pivotable connection of the legs with the anchor fitting is formed by respective pin-like projections on both leg end sections, which projections engage in an annular groove in the anchor fitting.

6. The connecting device according to claim 3, wherein the two legs of the bridge are each provided with an opening which has a dimension in the direction of the longitudinal axis of the screw that is larger than the dimension of a projection that engages in one of the respective openings, which projection is located on the base unit.

7. The connecting device according to claim 3, wherein the screw is provided with a carrier ring that can abut the underside of the yoke portion of the bridge facing the base unit.

8. The connecting device according to claim 3, wherein the end surface of the base unit lying opposite the anchor fitting in the longitudinal direction of the device is curved in the manner of a hollow cylinder and has a curvature radius adapted to that of the holes, and in that the end surface aligns with the edge of one of the holes at least when the anchor fitting is pointed into one of the holes.

9. The connecting device according to claim 2, wherein the anchor fitting is flattened on its side facing the base unit.

10. The connecting device according to claim 2, wherein the pivotable connection of the legs with the anchor fitting is formed by respective pin-like projections on both leg end sections, which projections engage in an annular groove in the anchor fitting.

11. The connecting device according to claim 10, wherein the end surface of the base unit lying opposite the anchor fitting in the longitudinal direction of the device is curved in the manner of a hollow cylinder and has a curvature radius adapted to that of the holes, and in that the end surface aligns with the edge of one of the holes at least when the anchor fitting is pointed into one of the holes.

12. The connecting device according to claim 2, wherein the two legs of the bridge are each provided with an opening which has a dimension in the direction of the longitudinal axis of the screw that is larger than the dimension of a projection that engages in one of the respective openings, which projection is located on the base unit.

13. The connecting device according to claim 2, wherein the screw is provided with a carrier ring that can abut the underside of the yoke portion of the bridge facing the base unit.

14. The connecting device according to claim 2, wherein the end surface of the base unit lying opposite the anchor fitting in the longitudinal direction of the device is curved in the manner of a hollow cylinder and has a curvature radius adapted to that of the holes, and in that the end surface aligns with the edge of one of the holes at least when the anchor fitting is pointed into one of the holes.

15. The connecting device according to claim 1, wherein the two legs of the bridge are each provided with an opening which has a dimension in the direction of the longitudinal axis of the screw that is larger than the dimension of a projection that engages in one of the respective openings, which projection is located on the base unit.

16. The connecting device according to claim 15, wherein the end surface of the base unit lying opposite the anchor fitting in the longitudinal direction of the device is curved in the manner of a hollow cylinder and has a curvature radius adapted to that of the holes, and in that the end surface aligns with the edge of one of the holes at least when the anchor fitting is pointed into one of the holes.

17. The connecting device according to claim 1, wherein the screw is provided with a carrier ring that can abut the underside of the yoke portion of the bridge facing the base unit.

18. The connecting device according to claim 1, wherein the end surface of the base unit lying opposite the anchor fitting in the longitudinal direction of the device is curved in the manner of a hollow cylinder and has a curvature radius adapted to that of the holes, and in that the end surface aligns with the edge of one of the holes at least when the anchor fitting is pointed into one of the holes.

* * * * *